United States Patent
Deering et al.

(12) 
(10) Patent No.: US 6,441,507 B1
(45) Date of Patent: Aug. 27, 2002

(54) ROTOR PITCH CONTROL METHOD AND APPARATUS FOR PARKING WIND TURBINE

(75) Inventors: Kenneth J. Deering, Seattle, WA (US); Dean A. Davis, Spanish Fork, UT (US)

(73) Assignee: The Wind Turbine Company, Bellevue, WA (US)

( * ) Notice: Subject to any disclaimer, the term of this patent is extended or adjusted under 35 U.S.C. 154(b) by 0 days.

(21) Appl. No.: 09/532,760

(22) Filed: Mar. 22, 2000

Related U.S. Application Data (60) Provisional application No. 60/191,214, and provisional application No. 60/191,132.

(51) Int. Cl.[7] .............................. F03D 7/04; F03D 7/06
(52) U.S. Cl. .............................. 290/44; 290/55; 416/27
(58) Field of Search ............................ 290/44, 656, 43, 290/54; 416/27, 26

(56) References Cited

U.S. PATENT DOCUMENTS

| 4,193,005 | A |   | 3/1980  | Kos et al. | 290/44  |
| 4,584,486 | A |   | 4/1986  | Quynn      | 290/44  |
| 4,673,822 | A |   | 6/1987  | Kikuchi    | 290/44  |
| 4,818,181 | A |   | 4/1989  | Kodric     | 416/196 |
| 5,289,041 | A | * | 2/1994  | Holley     | 290/44  |
| 5,584,655 | A | * | 12/1996 | Deering    | 416/31  |
| 5,616,963 | A |   | 4/1997  | Kikuchi    | 290/55  |

\* cited by examiner

*Primary Examiner*—Nicholas Ponomarenko
(74) *Attorney, Agent, or Firm*—Tejpal S. Hansra (57) ABSTRACT

A wind turbine is configurable with at least one blade is pitched to provide relatively high sensitivity to wind direction or sheer so as to perform a rudder function which moves the blades such that the vertical plane defined by the blade ends is substantially parallel to the wind direction. In one aspect, the wind turbine has at least two different blades having two different blade pitches. In one embodiment, the rudder action configures a two bladed wind turbine such that a non-rudder blade, having a pitch different from the rudder blade, has its free end pointing substantially directly into the wind, providing relatively low cross-sectional resistance to the wind and accordingly relatively low load.

26 Claims, 6 Drawing Sheets

ROTOR PITCH CONTROL METHOD AND APPARATUS FOR PARKING WIND TURBINE

Cross reference is made to U.S. patent application Ser. No. 60/191,214 entitled WIND TURBINE BLADE CONTROL APPARATUS AND METHOD IN RELATION TO NON-TORQUE FORCE COMPONENTS, and U.S. patent application Ser. No. 60/191,132 entitled WIND TURBINE CONTROL METHOD AND APPARATUS.

This invention was made with State of California support under California Energy Commission Contract Number 500-97-031. The Energy Commission has certain rights to this invention.

The present invention relates to control of wind turbine blade pitches for parking conditions and in particular controlling pitches such that at least one of the blades is pitched for parking, such as with a pitch substantially differently from another blade.

BACKGROUND INFORMATION

An important factor affecting the cost of wind turbine construction and operation is the load force that must be borne by the wind turbine apparatus and various components thereof. In general; loads are related to wind velocity and, to ensure the desired structural lifetime of a wind turbine and its components, as well as to assure safety, the wind turbine structure and components must be designed to withstand the anticipated load (typically, plus a margin of safety).

In many wind turbine systems, the wind turbine is placed in a parked condition (wherein energy is not being generated) during conditions of high wind speed and/or turbulence, although parked configurations may be instituted under other conditions as well. In a typical parked condition, the rotor or blades are braked so as to avoid rotation.

Because the parked condition is often implemented during high wind conditions, when relatively high loads are generated, the wind turbine structures and components must be designed to withstand anticipated loads (plus a safety margin) generated during parked high wind condition situations. Indeed, for some designs, the high wind parked condition defines the highest anticipated loads on the wind turbine or components thereof and thus defines the structure (and, typically the cost) of the wind turbine and/or its components. Accordingly, it would be useful to provide a method and apparatus which can achieve a reduction in forces or loads on a wind turbine or its components, particularly during high wind, turbulent wind and/or parked conditions.

In at least some wind turbine configurations, the blades or rotor (as well as typically the generator and nacelle) can undergo at least some amount of yaw (i.e., rotation about a substantially vertically axis). High wind and/or turbulent conditions can result in a magnitude or rate of yaw which is undesirably large; such as creating undesirably large loads on a yaw bearing and the like). Accordingly, it would be useful to provide an apparatus and method which can reduce the magnitude or frequency of yaw, e.g., during high wind or turbulent wind events.

SUMMARY OF THE INVENTION

According to one aspect of the invention, during, or in anticipation of, high wind, turbulent wind and/or parked conditions or configurations, at least one blade is positioned with a pitch so as to act substantially as a rudder, preferably having a pitch substantially different from at least one other blade of the turbine. Preferably, the two pitches are such that one blade is substantially more sensitive to (generates substantially larger yaw torque in response to) changes in wind direction than at least one other blade. In one embodiment, one of the blades is provided with a substantially 0° effective pitch (such that the effective or average airfoil axis or cross-sectional axis is substantially vertical) while at least one other blade is substantially feathered, having approximately a 90° pitch (such that the effective or average airfoil or cross-sectional axis is substantially horizontal). In such a configuration, the zero-pitch blade acts generally as a rudder, causing the rotor to yaw so that all blades are positioned with free ends in a plane substantially parallel to the wind direction, with the free end of the zero-pitch blade pointing downstream.

Preferably, the wind turbine is provided with actuators and controls capable of achieving the described pitch, such as pitch actuators which can set pitches of two or more blades to different values and/or computer-implemented or other procedures for generating the described pitch and/or calculating desired or preferable pitches.

In one embodiment, the present invention involves providing a wind turbine which can be placed in such load- and/or yaw-reducing configuration and which has reduced cost, (such as reduced structural, tower and/or bearing costs) such as resulting from reduced anticipated loads and/or yaw, e.g., compared with the cost that would be required without the load and/or yaw reduction achieved according to the present invention.

According to one aspect, a wind turbine is configurable with at least two different blades having two different blade pitches. In one aspect, at least one blade is pitched to provide relatively high sensitivity to wind direction or sheer so as to perform a rudder function such that the vertical plane defined by the blade ends is substantially parallel to the wind direction. In one embodiment, the rudder action configures a two bladed wind turbine such that the non-rudder blade, having a pitch different from the rudder blade, has its free end pointing substantially directly into the wind, providing relatively low cross-section for resistance to the wind and accordingly relatively low load.

DETAILED DESCRIPTION OF THE PREFERRED EMBODIMENT

Figures 1, 6, 7, 8, 9, 10:
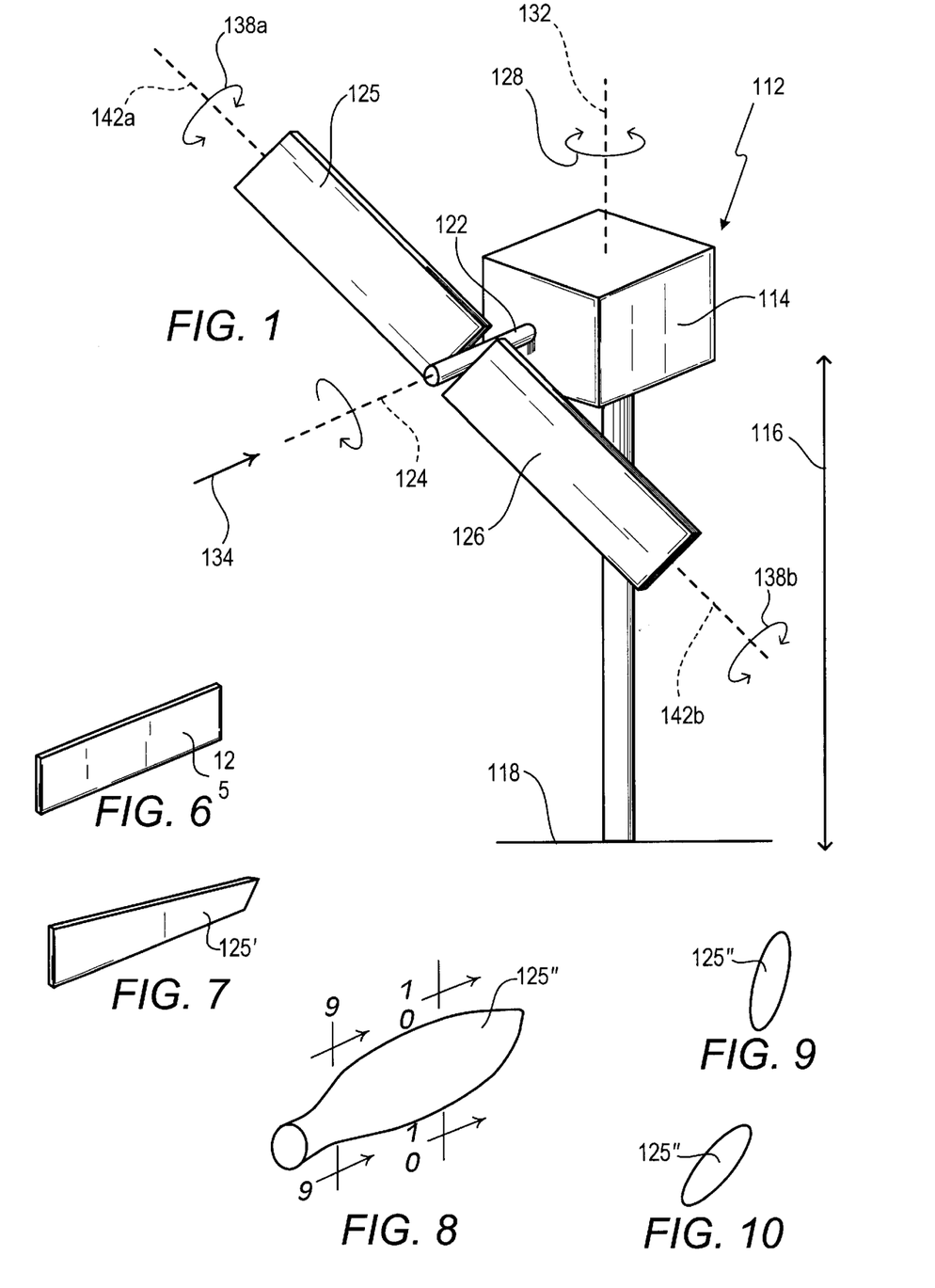
FIG. 1 is a perspective view of a wind turbine device according to an embodiment of the present invention.
FIGS. 6 is a perspective view of an untwisted simplified blade.
FIG. 7 is a perspective view of a twisted simplified blade.
FIG. 8 is a perspective simplified view of a tapered blade.
FIG. 9 is a cross-sectional view taken along line 9—9 of FIG. 8.
FIG. 10 is a cross-sectional view taken along line 10—10 of FIG. 8.

As depicted in FIG. 1, a wind turbine 112 includes a nacelle 114 (commonly housing a gear box, generator, yaw bearings or other bearings and the like, not shown) positioned at a first height 116 (such as, for example, about 60 meters) above the ground 118. A rotor shaft 122 defines an axis of rotation 124 for rotor blades 125, 126. The rotor blades are blades which, during normal (e.g. power generation) conditions, rotate in response to wind flow. Although, for simplicity of illustration, in FIGS. 1 through 5 and 11, the blades, e.g., 125, are depicted as a rectangular parallelpiped or "plank", shown in perspective in FIG. 6, it is common to provide blades which have a degree of longitudinal twist 125' as depicted in FIG. 7. Furthermore, blades often have a longitudinal tapered shape 125" as depicted in FIG. 8 with an amount of longitudinal twist as seen from the cross-sectional views of FIGS. 9 and 10. As will be understood by those of skill in the art, when the blades are twisted (FIG. 7) and/or tapered (FIGS. 8 through 10), the blade pitch can be designated by an average, effective or aerodynamic pitch angle. For example, the respective pitch angle of 90° or a feathered pitch angle for a twisted and/or tapered blade is the pitch angle which (in the absence of rotation and at 0° yaw) presents the minimum resistance to wind flow (analogous to the pitch depicted in FIG. 2A) and a 0° pitch is that pitch which presents the maximum resistance (at 0° yaw) to wind flow (analogous to the pitch depicted in FIG. 3A) generally, the positive/negative sign of the pitch angle is designated with respect to the leading edge of the rotating blade. Nevertheless, those of skill in the art will understand the present invention with reference to the simplified depiction of FIGS. 1 through 5 and 11, after understanding the present disclosure.

As depicted in FIG. 1, the structure including the nacelle 114, shaft 122 and blades 125, 126 can undergo a yaw motion or rotation 128 about the vertical axis 132. For purposes of description herein, the yaw angle will be described with respect to the wind direction 134 such that the yaw angle depicted in FIG. 1, with the axis of rotation 124 parallel to the wind direction 134 and the rotor shaft 122 extending outwardly from the nacelle 114 in an upsteam (windward) direction is a yaw angle of 0°. During normal operating conditions the wind turbine will be configured such that the structure is yawed such that the rotation axis 124 is substantially parallel to the wind direction 134. In some configurations, this is achieved through one or more yaw drives which are controlled to achieve a preferred yaw angle. In other configurations, the wind turbine is allowed to freely yaw in response to aerodynamic forces (generally with a degree of friction and/or damping).

Figure 2A:
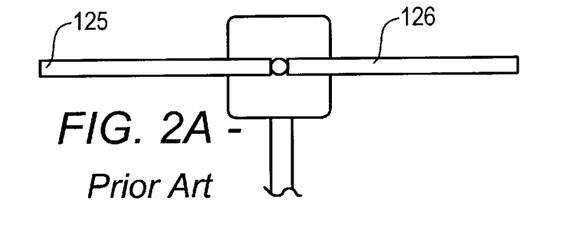
FIGS. 2A, B and C are front elevational, top and side elevational partial views of a wind turbine according to previous approaches.
Figure 2B:
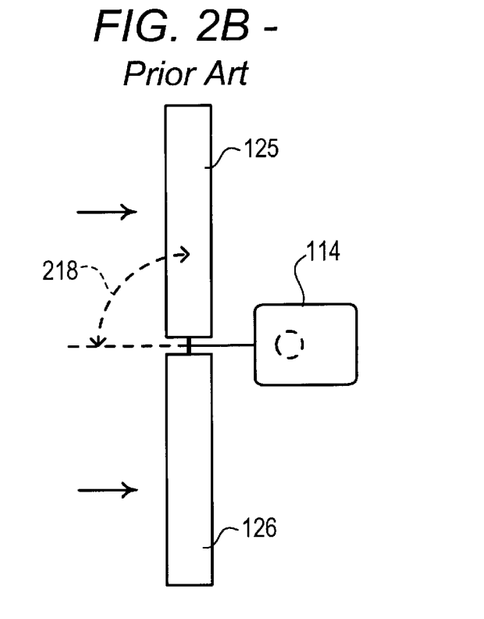
Figure 2C:
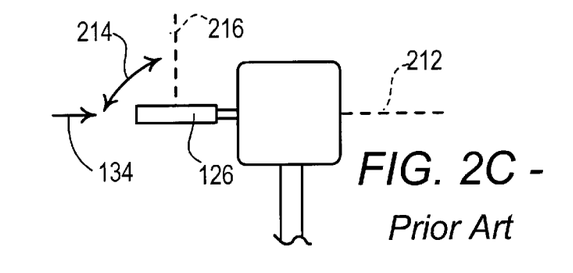

In some configurations, the blades 125, 126 are controllable to adjust the rotational position 138a, 138b about the blade longitudinal axis 142a, 142b, known as the pitch of the blades. Those of skill in the art will understand how to position, move and control wind turbine blades, e.g., using pneumatic, electric or other, blade actuators and actuator controls to provide desired pitches; those of skill in the art will understand how to model or predict wind conditions in this regard. In the simplified (untwisted) configuration depicted in FIGS. 1 through 5 an 11, the pitch angle is the angle between the plane defined by the blade and an imaginary plane perpendicular to the rotation axis 124. In the blade pitch depicted in FIGS. 2A, B and C, the blade 126 is pitched to a plane 212 which is at an angle 214 of about 90° with respect to the imaginary plane 216 perpendicular to the axis of rotation 124. The pitch depicted in FIGS. 2A, 2B and 2C is referred to herein as a 90° pitch. This pitch, which presents (for the depicted zero degree yaw) a minimum surface area to the wind flow 134 is also denoted as a "feathered" pitch.

Figure 3A:
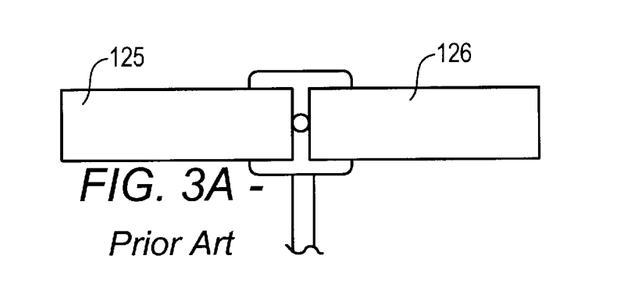
FIGS. 3A, B and C are front elevational, top and side elevational partial views of a wind turbine device according to previous approaches.
Figure 3B:
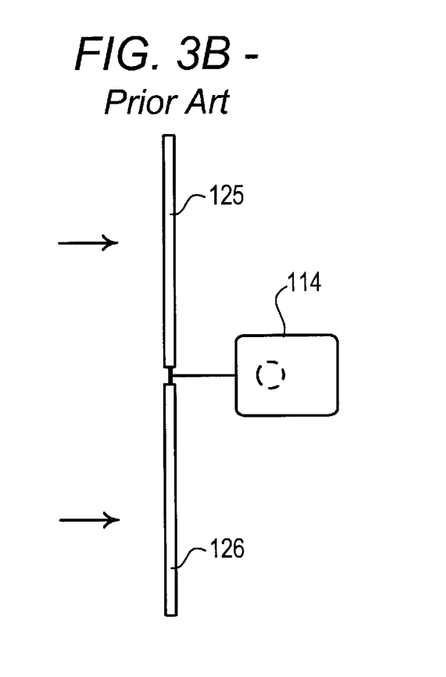
Figure 3C:
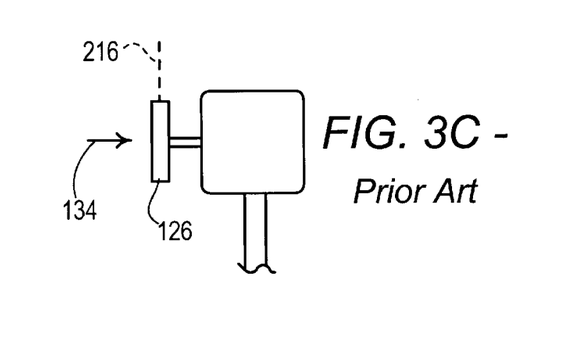
Figure 4A:
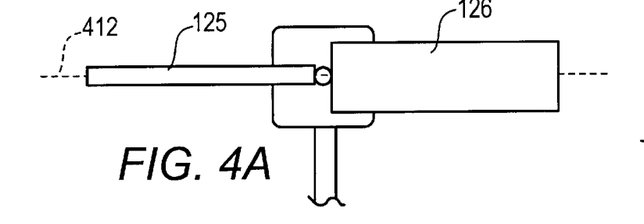
FIGS. 4A, B and C are front elevational, top and side elevational views of a wind turbine according to one embodiment of the present invention.
Figure 4B:
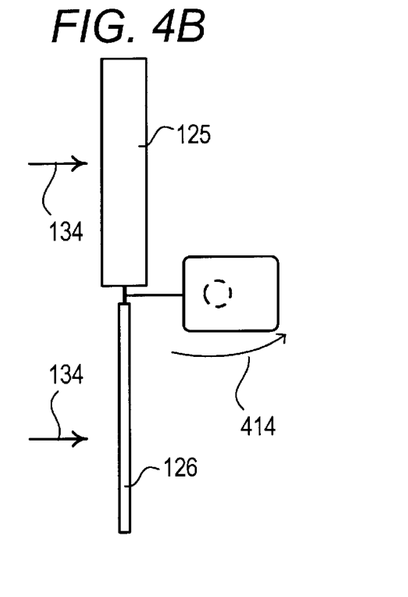
Figure 4C:
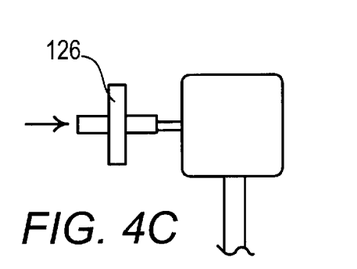
Figure 5A:
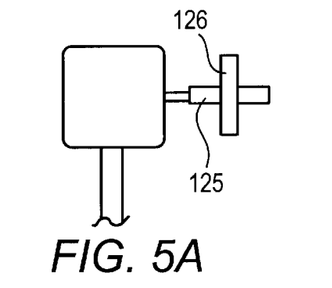
FIGS. 5A, B and C are front elevational, top and side elevational views of the wind turbine of FIGS. 4A, B and C, respectively, after yaw.
Figure 5B:
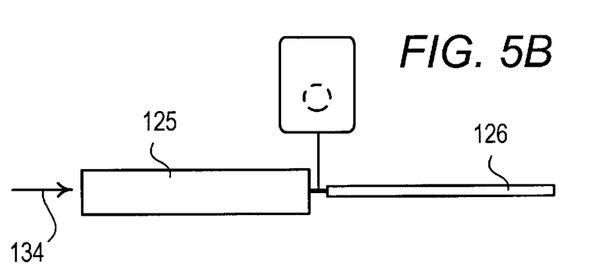
Figure 5C:
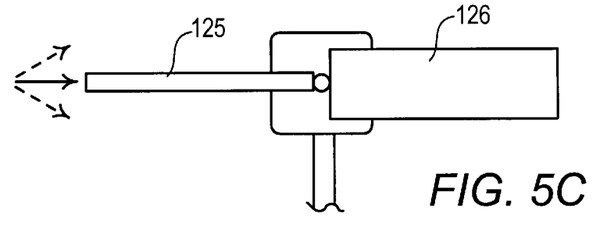

FIGS. 3A, B and C depict a configuration in which the blades 125, 126 have a zero pitch, such that the plane defined by the blade 126 is substantially parallel to the imaginary plane 216 perpendicular to the rotation axis 124.

Previous wind turbine systems have generally been configured to provide substantially similar pitch such as differing by no more than about 10° and typically, substantially identical, at least in parked and/or high wind conditions. FIGS. 2A, B and C depict both blades 125, 126 with a 90° pitch and FIGS. 3A, B and C depict both blades 125, 126 with a 0° pitch.

Figure 15:
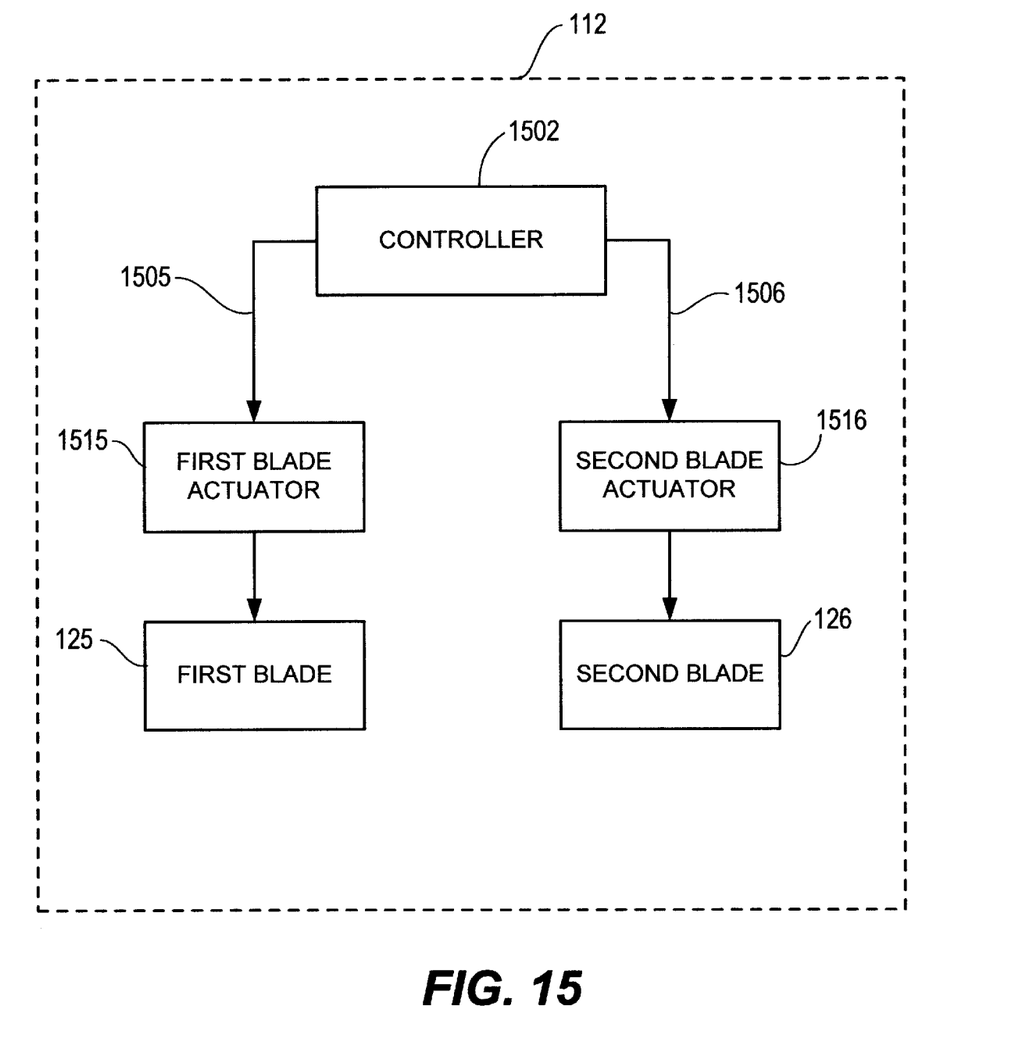
FIG. 15 is a simplified block diagram representation of a wind turbine of one embodiment of the present invention.

FIG. 15 is a simplified block diagram representation of a wind turbine of one embodiment of the present invention. As shown in FIG. 15, the wind turbine 112 has a controller 1502, a first blade actuator 1515 for adjusting the pitch of the first blade 125 in response to a first electrical control signal 1505 and a second blade actuator 1516 for adjusting the pitch of the second blade 126 in response to a second electrical control signal 1506.

According to one embodiment of the present invention, for at least parked and/or high wind or turbulent wind conditions, at least one blade is provided with a pitch which differs substantially from the pitch of at least one other blade, such as differing by more than about 10°, preferably more than about 45° and even more preferably differing by about 90° in pitch. By providing at least one blade with a substantially different pitch, it is possible to configure one blade such that it is substantially more sensitive to wind direction (e.g., generating substantially greater yaw force in response to a change in wind direction) compared to at least one other blade. A blade which is relatively sensitive to wind direction can accordingly act substantially as a rudder, "tracking" wind direction by maintaining itself substantially parallel to the direction of wind flow.

Figures 11, 13:
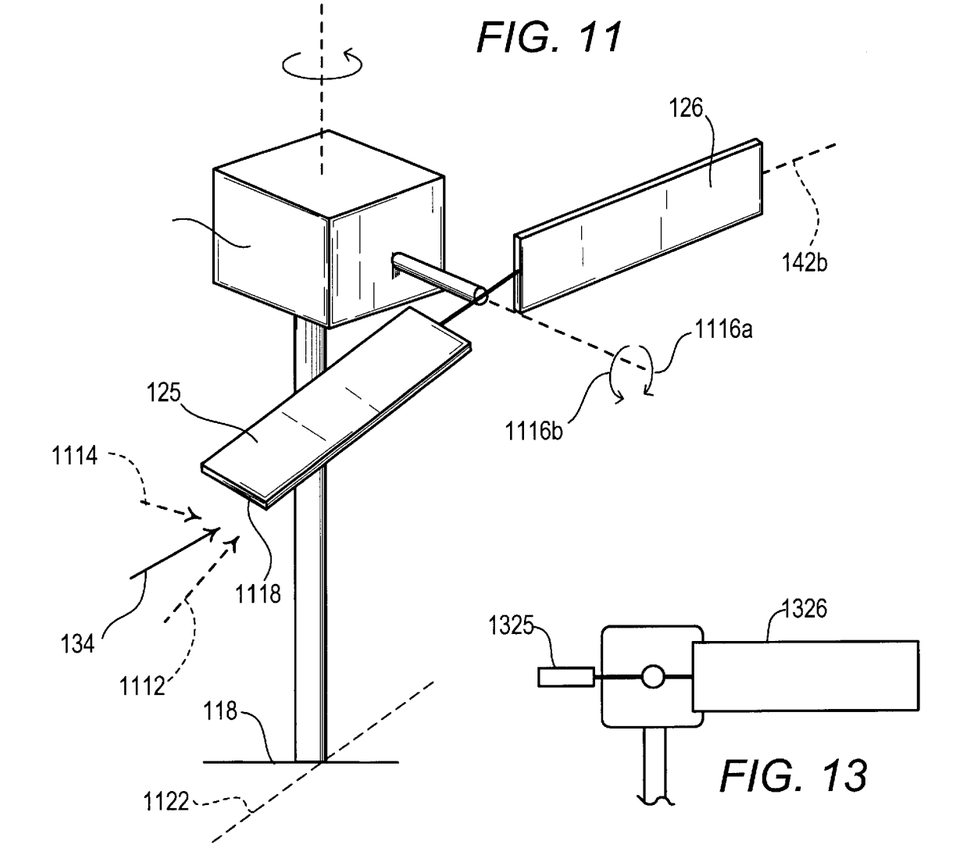
FIG. 11 is a perspective view of a wind turbine according to an embodiment of the present invention, following yaw.
FIG. 13 is a view similar to that of FIG. 4A, but showing a 1-bladed wind turbine.

When the wind turbine is a two-bladed wind turbine (e.g., as depicted in FIGS. 1 through 5 and 11) the other (non-rudder) blade will point substantially diametrically opposite the rudder blade. The free end of the opposite (non-rudder) blade will accordingly point substantially directly into the wind thus presenting relatively little cross-sectional area and relatively little resistance to the wind flow and accordingly achieving reduced load compared to at least some other configurations. Preferably such opposite blade is pitched so as to be relatively insensitive to wind direction (i.e., imparting substantially less yaw torque in response to changes of wind direction, compared to the rudder blade) so as to maintain the function of the rudder blade as the dominant rudder. Such relatively strong rudder effect can limit or reduce the magnitude or velocity of yaw motions or forces. A high wind turbulent wind and/or parked condition pitch control method and apparatus according to one embodiment of the invention is depicted in FIGS. 4A, B and C and 5A, B and C and 11. In the depicted embodiment, when it is desired to place the wind turbine in parked condition and/or in anticipation; or in response to detection; of high winds and/or turbulent winds, the blades are braked and maintained at a desired azimuth angle. In one embodiment, the azimuth angle, as depicted in FIG. 4A positions blade 126 at 90° and blade 125 at 270°, e.g., such that the blades' longitudinal axes lie in a horizontal plane 412. Blade 126 is positioned with a 0° pitch and blade 125 is feathered to a 90° pitch, as depicted in FIGS. 4A, B and C. In this configuration, blade 125 is edge-on to the incoming wind flow 134 and blade 126 is face-on to the incoming wind flow 134. This creates a yaw motion 414, to rotate the blades 90° to the configuration depicted in FIGS. 5A, B and C such that the longitudinal axes of the blades are substantially parallel to the wind direction 134. The yawing motion 414 can result from permitting a free-yaw (or frictionally or otherwise damped yaw) configuration although, if desired, yaw drive mechanisms can be used to controllably drive and/or maintain the wind turbine to the desired yaw as depicted in FIG. 11. As best seen in FIG. 11, the 0° pitch blade 126 is positioned to act substantially as a rudder maintaining the common longitudinal axes of the blades 142a and b substantially parallel to the wind direction 134. It is possible that the wind flow may have an upward or downward vertical component, such as having a degree of up-tilt 1112 or down-tilt 1114. If desired, the azimuth angle of the blades maybe adjusted 1116a, 1116b, e.g., to point the leading edge 1118 of the upstream blade 125 directly into the up-tilted 1112 or down-tilted 1114 wind, especially when the vertical component is relatively constant (e.g., such as arising from a tilted terrain 1122 and the like).

Figure 12:
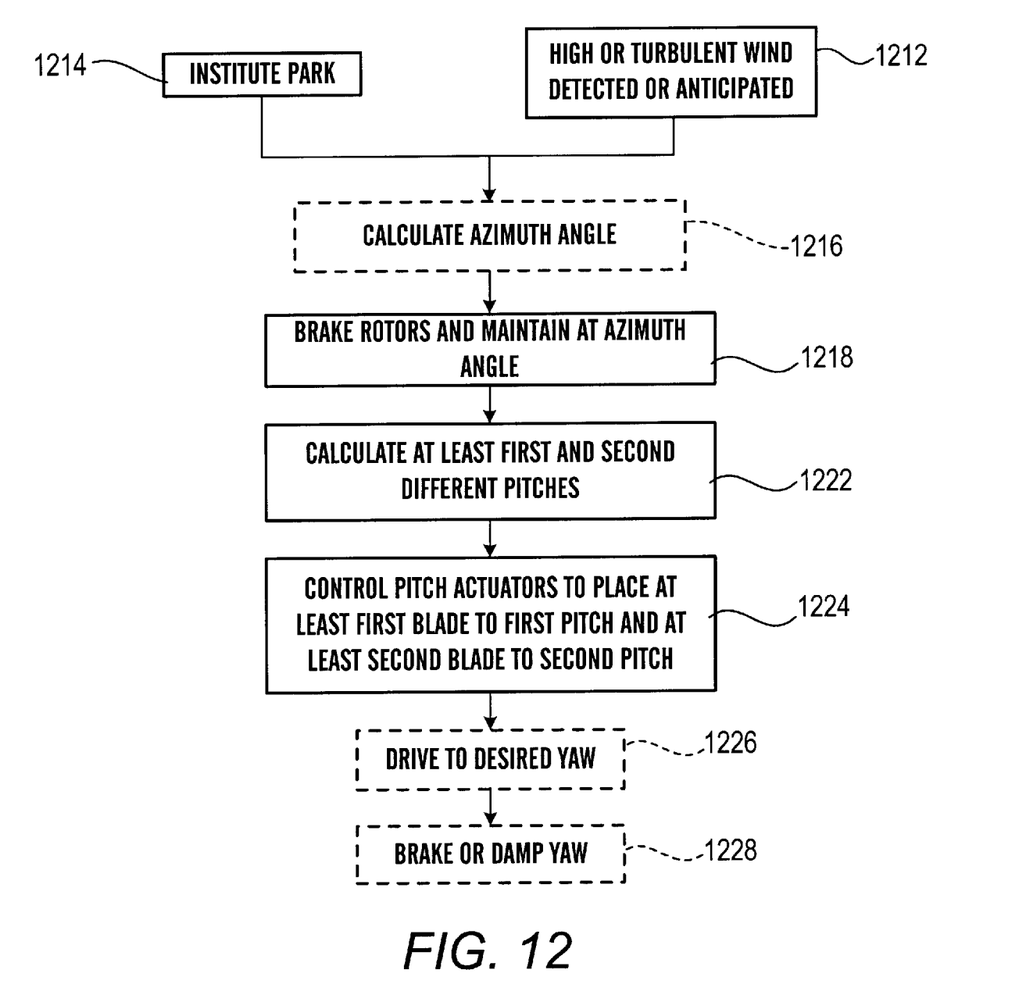
FIG. 12 is a flow chart depicting a park method according to an embodiment of the present invention.

In practice, as depicted in FIG. 12, a procedure according to the present invention may be instituted in a number of situations, including when high or turbulent wind is detected or anticipated 1212, or when it is decided for any reason to institute a park procedure 1214. What constitutes high wind conditions will vary depending on the wind turbine configuration and situation but in at least some circumstances can be considered as winds with a substantially sustained speed of about 40 meters per second or more, in some cases 50 meters per second or more, and/or gusts (e.g., of 3 seconds or more) with wind speeds of, e.g., 60 to 70 meters per second or more. Although it is possible to use the present invention in connection with any of a plurality of blade azimuth angles or azimuth angle ranges, it is generally preferred to position the rudder blade with a non-vertical azimuth angle, and preferably a substantially horizontal angle (or at a inclined angle to accommodate wind up-tilt or down-tilt). Thus, it is possible to, among other options, provide a system in which a blade which is to be a rudder blade is always positioned at a predetermined azimuth angle, such as horizontal, or within a predetermined azimuth angle range (such as horizontal plus or minus 30° and the like). In some embodiments it may be desirable to calculate a desired azimuth angle 1216 such as when the azimuth angle is to take into account terrain-induced up-tilt or down-tilt, which may for example, be affected by expected or sensed wind direction. The rotors, if currently rotating, are braked and the blades are maintained at the desired azimuth angle 1218. It is also possible to provide configurations in which the blade azimuth angle is continuously or periodically recalculated and/or adjusted, e.g., to accommodate changes in vertical component of the wind.

In general, the configuration of the blades (such as amount and type of twist, tapering, cross-sectional shape and the like) is known and constant (although there are some configurations in which blade shape can be adjusted) and accordingly, the sensitivity of each blade as a function of blade pitch, to wind direction or wind direction changes is known. Thus, in some configurations, the desired pitches for the blades to achieve the described rudder function are constant and predetermined pitch values. In general, it will be desired to position one or more non-rudder blades in a feathered pitch, such as a 90° pitch, and to position the rudder blade with a pitch approximately 90° from the feathered blade, e.g., with a 0° pitch. However, it may be that, considering the twist, aerodynamic airfoil shape of the blades and other blade characteristics, desired rudder function may be arrived at using other pitch values.

In yet another configuration, it may be that the desired pitch, (e.g., pitches so as to maximize rudder functionality and/or pitches to provide desired rudder functionality while maximizing controlling or preserving other characteristics such as torque load and the like) is a function of conditions such as wind speed, wind direction, air temperature and the like. In these configurations, it may be desirable to calculate at least first and second different pitches 1222.

Pitch actuators are controlled to place at least the first blade to the first pitch and at least a second blade to the second pitch 1224. Accordingly, one aspect of the present invention involves providing a wind turbine system in which at least two blades can be positioned at different pitches. Preferably, the pitches are independently controllable. However, it is also possible to provide a system in which, in response to a park command, a single controller and/or actuator automatically offsets the pitch of at least two blades by about 90°. In at least some configurations, the rudder effect of the rudder blade suffices to produce yaw sufficient to point the non-rudder blade into the wind. However, in some configurations it may be desirable to use a yaw drive mechanism to assist in positioning the blades to the desired yaw 1226. Although the rudder effect of the rudder blade will, in at least some configurations, suffice to avoid undesirable yaw excursions (i.e., such as non-parallelism between the blade longitudinal axis and the wind direction), in some configurations, it is desired to further limit or control yaw by providing a degree of braking or damping, such as frictional braking of the yaw bearing 1228.

In light of the above description, a number of advantages of the present invention can be seen. The present invention provides a manner of reducing loads on wind turbine structures or components thereof particularly in high wind or turbulent wind conditions in a fashion which is relatively inexpensive to design, fabricate and maintain, e.g., as compared with the cost of additional structural strength needed for accommodating greater loads. The present invention can reduce or limit yaw magnitude, velocity or excursions, especially in high wind or turbulent wind conditions. The present invention makes it feasible to provide wind turbines which are relatively lighter and less expensive than those necessary for to achieve desired lifetimes and safety levels, compared to wind turbines not operated or constructed according to the present invention.

Figure 14:
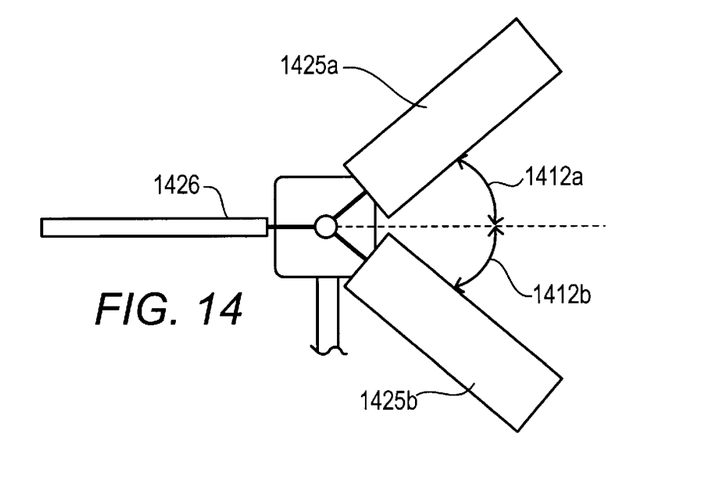
FIG. 14 is a view similar to that of FIG. 4A, but showing a 3-bladed wind turbine.

A number of variations and modifications of the invention can be used. It is possible to use some aspects of the invention without using others. For example, it is possible to provide blades of two or more different pitches without configuring or using one of the blades as a rudder control. It is possible to provide the described rudder control during conditions other than high wind conditions, turbulent wind conditions or parked configurations. The present invention can be used when some or all of the blades are provided with a degree of coning or flap angle 218. Although a procedure has been described according to a embodiment of the present invention, it is possible to use other procedures and/or to modify the described procedure to delete steps, add steps or perform steps in an order different from that depicted. For example, in some configurations, certain steps may be performed substantially simultaneously, such as braking rotor rotation simultaneously with bringing blades to desired pitches. Preferably, some or all control or configuring steps are performed by or using microprocessors or computers, although it is possible to provide fully manual controls for some or all processes. Wind turbines according to the present invention can advantageously be used for generating electrical power although it is also possible to use wind turbines for directly or indirectly performing other tasks. Although the invention has been illustrated by reference to a upstream-rotor wind turbine, some or all aspects of the invention can be used in connection with rotors which are downstream of the nacelle and/or tower. Although the present invention has been illustrated in connection with a two-bladed wind turbine, some or all aspects of the invention may be used in connection with a wind turbine having three or more blades. In one embodiment of a three-bladed wind turbine (FIG. 14), two blades 1425a,b would be pitched to the approximate zero pitch position and the third blade 1426 would be set to approximately 90° pitch position, and approximately horizontal azimuth. The two blades at zero pitch 1425a,b would have azimuth positions of approximately ±60° 1412a,b inclined to horizontal and in this way would collectively serve the rudder function. Loads acting on a three-blade rotor are believe to be substantially reduced when parked in this manner (compared to an approach in which all three blades are pitched to the same pitch, typically either 0° or 90°). For a single blade rotor (FIG. 13), the blade 1326 would be pitched to 0° nominally into the incident wind. Parking a single blade rotor in this way is believe to represent a low-load strategy. In some wind turbine configurations, the longitudinal axis of the blades may not be co-linear (such as in multi-bladed configurations and/or configurations with coning or flap angle). In one embodiment, the rudder blade (or the plane defining the pitch angle of the rudder blade) lies in a vertical plane substantially parallel to the wind direction, or positions the rotors such that a vertical plan passing through the ends of the rotors is substantially parallel to the wind direction. In one embodiment, where the cone angle is adjustable, the cone angle is adjusted so as to position the blade ends in a common plane with the blade roots.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. Apparatus for control of blade pitch in a wind turbine having a plurality of blades each having a blade pitch, comprising:
    a first pitch actuator, coupled to a first blade of said wind turbine, wherein said first blade has an adjustable blade pitch and wherein said first pitch actuator is controllable to adjust the pitch of said first blade, to position said first blade to have a first blade pitch different from the pitch of one of said plurality of blades.

2. Apparatus, as claimed in claim 1, wherein said pitch actuator is controllable in response to a first electrical control signal.

3. Apparatus, as claimed in claim 1, wherein said first blade pitch is about a 0° pitch.

4. Apparatus, as claimed in claim 1, wherein said first blade pitch causes said first blade to have a first sensitivity to wind direction and wherein said first blade provides a rudder function.

5. Apparatus, as claimed in claim 1, further comprising;
    a second pitch actuator, coupled to a second blade of said wind turbine, wherein said second blade has an adjustable blade pitch and wherein said second pitch actuator is controllable to adjust the pitch of said second blade, to position said second blade to have a second blade pitch different from the pitch of said first blade.

6. Apparatus, as claimed in claim 5, wherein said second blade pitch causes said second blade to have a second sensitivity to changes in wind direction, wherein the second sensitivity is less than the first sensitivity.

7. Apparatus as claimed in claim 5, wherein said second blade has a substantially feathered pitch.

8. Apparatus, as claimed in claim 5, wherein said second blade pitch differs from said first blade pitch by about 90°.

9. Apparatus, as claimed in claim 1, wherein said wind turbine has exactly two blades.

10. Apparatus, as claimed in claim 1, wherein said wind turbine has exactly three blades.

11. Apparatus, as claimed in claim 10, wherein said first blade pitch is substantially a 90° pitch.

12. Apparatus, as claimed in claim 11, wherein the pitch of second and third blades is set to substantially 0°.

13. Apparatus, as claimed in claim 11, wherein said first blade is set to substantially a horizontal azimuth.

14. A method for use in connection with a wind turbine, having a plurality of blades, comprising:
    positioning a first of said plurality of blades, during a first time period, to have a first blade pitch which is different from a second blade pitch of a second of said plurality of blades.

15. A method, as claimed in claim 14, wherein said second blade pitch is about 90° from said first blade pitch.

16. A method, as claimed in claim 14, further comprising adjusting an azimuth angle of one of said plurality of blades to be substantially parallel to a wind direction.

17. A method, as claimed in claim 14, further comprising adjusting an azimuth angle of at least one of said plurality of blades to a substantially horizontal azimuth angle.

18. A method, as claimed in claim 14, wherein said first blade pitch causes said first blade to have a first sensitivity to wind direction and wherein said first blade provides ruddering.

19. A method, as claimed in claim 18, wherein said ruddering comprises providing yaw rotation to position free ends of said plurality of blades in a plane substantially parallel to said wind direction.

20. A method, as claimed in claim 14, further comprising positioning said plurality of blades, during at least a second time period, to have substantially equal pitch, wherein said plurality of blades rotate about a common rotation axis, in response to windflow.

21. Apparatus comprising:
   a wind turbine, having a plurality of blades:
      means for positioning a first of said plurality of blades, during a first time period, to have a first blade pitch which is different from a second blade pitch of a second of said plurality of blades.

22. Apparatus, as claimed in claim 21, wherein said second blade pitch is about 90° from said first blade pitch.

23. Apparatus, as claimed in claim 21, further comprising means for adjusting an azimuth angle of at least one of said plurality of blades to be substantially parallel to a wind direction.

24. Apparatus, as claimed in claim 21, further comprising means for adjusting an azimuth angle of at least one of said plurality of blades to a substantially horizontal azimuth angle.

25. Apparatus, as claimed in claim 21, wherein said first blade pitch causes said first blade to have a first sensitivity to wind direction and wherein said first blade provides ruddering.

26. Apparatus, as claimed in claim 21, further comprising means for positioning said plurality of blades, during at least a second time period, to have substantially equal pitch, wherein said plurality of blades rotate about a common rotation axis, in response to windflow.

\* \* \* \* \*